INVENTOR.
EDWARD P. SPAVEN
BY Edward M. Apple
ATTORNEY

United States Patent Office 3,528,667
Patented Sept. 15, 1970

3,528,667
PISTON RING
Edward P. Spaven, 6548 Reuter, Dearborn, Mich. 48126
Filed June 11, 1968, Ser. No. 736,175
Int. Cl. F16j 9/06; F02f 5/00
U.S. Cl. 277—139                                    2 Claims

ABSTRACT OF THE DISCLOSURE

This application discloses an improved piston ring, which comprises the combination of a "Teflon" element and a metal backing ring or expander. The invention resides in the combination and arrangement of parts and in the functional aspects of the device.

---

This invention relates to piston rings for internal combustion engines and has particular reference to an improved ring which is economical to manufacture and install and efficient in operation.

An object of the invention is to generally improve piston rings, and to provide a ring which makes use of a "Teflon" element in combination with a metal expander to effect the sealing and improved lubrication of the space between the piston and the cylinder walls.

"Teflon" is a registered trademak which identifies a plastic material consisting of a tetrafluoroethylene polymer. The material is characterized by outstanding chemical resistance and good head stability. It is inert, except in the presence of molten alkali metal, and it is highly resistent to organic materials. It can be easily extruded, and it is easily machined with standard wood working and metal working tools.

It is, therefore, another object of the invention to make use of these characteristics in the extremely hot environment of an internal combustion engine, by using the specially constructed "Teflon" ring, in combination with an improved expander, as herein disclosed.

Another object of the invention is to provide a piston ring, the use of which obviates the necessity of a plurality of conventional oil rings and compression rings.

Another object of the invention is to provide a ring with recesses formed therein, which are arranged to capture sufficient oil during the reciprocation of the piston to properly lubricate the parts, but without danger of "blow by" and the excessive burning of oil.

Another object of the invention is to provide a piston ring which will greatly minimize crankcase pressure and undesirable exhaust emission.

Another object of the invention is the provision of a piston ring which will readily adapt itself to cylinder wall irregularities to effect a perfect seal at all times.

Another object of the invention is to provide an expander for the "Teflon" element which is constructed with T-shaped fingers at top and bottom of the ring, and around its periphery, which exert radial pressure against the "Teflon" element, in the direction of the cylinder walls, whereby to effect a more perfect seal at the top and bottom of the ring.

Another object of the invention is to provide a piston ring in which the "Teflon" element is substantially T-shaped in cross section, and is provided on its wiping face with a peripheral V shaped groove, which serves to make the ring more flexible, and provides, in effect, two wiping faces and serves as a means for trapping oil, to help lubricate the cylinder walls.

The foregoing and other objects and advantages of the invention will become more apparent as the description proceeds, reference being made from time to time to the accompanying drawing, forming part of the within disclosure, in which drawing.

Figure 1:
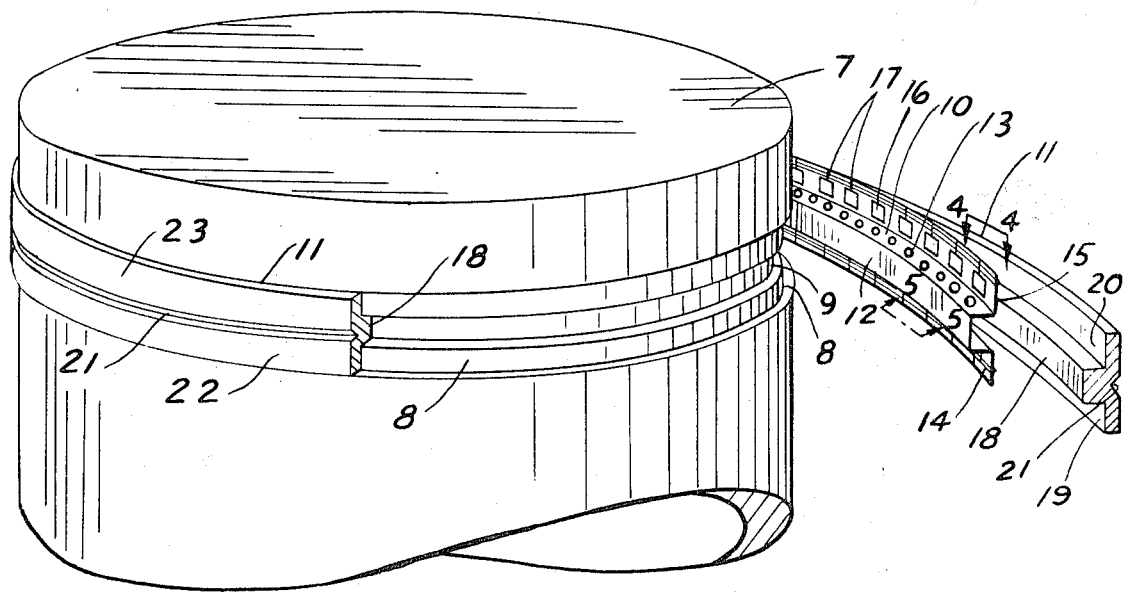
FIG. 1 is a fragmentary perspective view of an internal combustion engine piston, equipped with my improved combination ring. The ring and expander are shown, in section, and in expanded condition.

Referring now more particularly to the drawing, it will be understood that in the embodiment herein disclosed, the reference character 7 indicates, in general, the piston of an internal combustion engine, which is equipped with the device embodying invention. The piston 7 has a peripheral groove 8, which groove is routed as at 9, so that it may, in a close fit, receive the expander ring 10, which is preferably made of metal and is more particularly described hereafter, and the "Teflon" element 11 which is also more particularly described hereinafter.

The metal expander 10 is formed with a channel shaped body 12, which is received in the routed portion 9 of the groove 8. The body portion 12 of the expander has a plurality of apertures 13 extending therethrough, which apertures are provided to give the expander greater flexibility. The apertures 13 also permit the escape of any oil that may be trapped in the ring groove 8, and routed portion 9.

Figure 3:
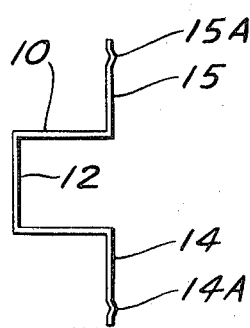
FIG. 3 is an enlarged sectional view of the metal expander comprising part of my ring assembly.

The body 12 of the expander is provided with outwardly directed flanges 14 and 15, which flanges are provided with spaced cutouts 16, and vertical cuts 17, in order to give increased flexibility to the expander ring. The flanges 14 and 15 (FIG. 3) are bent longitudinally as at 14A and 15A (FIG. 3). The bends 14A and 15A are intended to exert radial pressure near the edges of the "Teflon" element 11 to increase the sealing capacity of the "Teflon" element, particularly along its edges.

Figure 2:
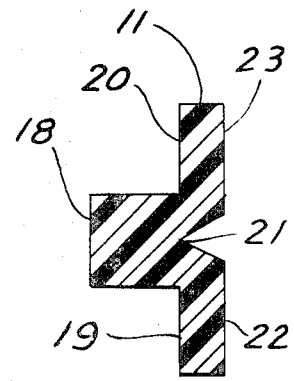
FIG. 2 is an enlarged sectional view of the "Teflon" element comprising part of my ring assembly.
Figure 4:
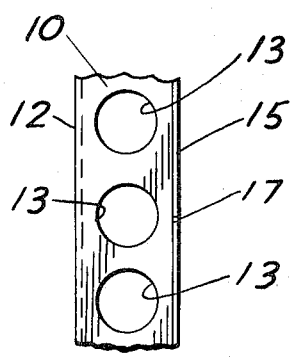
FIG. 4 is an enlarged fragmentary detail, in plan view, taken substantially on the line 4—4 of FIG. 1.
Figure 5:
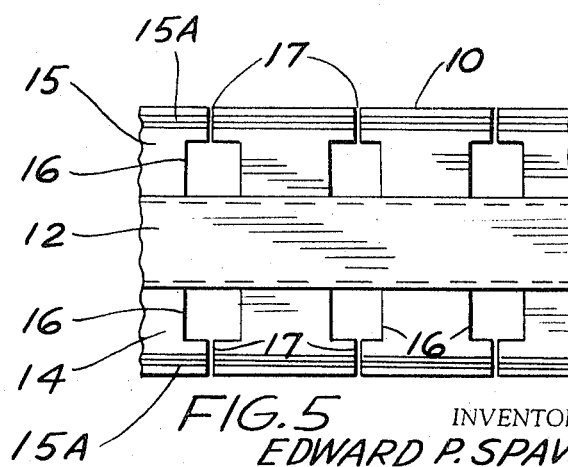
FIG. 5 is an enlarged fragmentary elevational view taken substantially on the line 5—5 of FIG. 1.

The "Teflon" element 11 (FIG. 2) is substantially T-shaped in cross section. The body 18 (FIG. 2) of the T is tightly received in the channel of the expander ring 10, with the arms, 19 and 20 of the T closely abutting the flanges 14 and 15 of the expander ring 10. The outward face of the "Teflon" member 11 is provided with a V groove 21. The V groove 21, in effect, divides the face of the "Teflon" ring 11 into two separate wiping faces, 22 and 23 (FIG. 2). The V groove 21 also serves as a trap for oil and insures an even distribution of oil over the surface of the cylinder walls during the reciprocation of the piston 7 in its cylinder.

With the use of the single combination of "Teflon" and metal expander rings, as hereinabove described, I can eliminate the plurality of oil and compression rings conventionally used in an internal combustion engine.

It is believed that the operation of the device is obvious from the foregoing description.

Having described my invention, what I claim and desire to secure by Letters Patent is:

1. A ring assembly for a piston, comprising a substantially T shaped in cross section "Teflon" element having its body portion received in a channel shaped in cross section metal expander element both being received in a peripheral groove formed in said piston, the body of said metal expander being provided with outwardly directed flanges, said flanges having spaced lateral cuts therein and each flange having a longitudinal bend therein which exerts outward radial pressure on one of the arms of said "Teflon" element.

2. The structure of claim 1, in which the peripheral groove of said piston is provided with a routed central section, in which is received the channel portion of said expander and the body portion of said "Teflon" element.

References Cited

UNITED STATES PATENTS

| 2,729,524 | 1/1956 | Prasse | 277—157 |
| 2,846,280 | 8/1958 | Berg | 277—157 |
| 3,118,681 | 1/1964 | Fuehrer | 277—157 X |

SAMUEL ROTHBERG, Primary Examiner

U.S. Cl. X.R.

277—157